(12) United States Patent
Gelber (10) Patent No.: US 11,723,457 B2
(45) Date of Patent: Aug. 15, 2023

(54) OVERHEAD STORAGE UNIT

(71) Applicant: 143046 Canada Inc., Montreal (CA)

(72) Inventor: Eleaizer Gelber, Montreal (CA)

(73) Assignee: 143046 Canada Inc., Montreal (CA)

( * ) Notice: Subject to any disclaimer, the term of this patent is extended or adjusted under 35 U.S.C. 154(b) by 210 days.

(21) Appl. No.: 16/481,131

(22) PCT Filed: Jan. 27, 2017

(86) PCT No.: PCT/CA2017/050087
§ 371 (c)(1),
(2) Date: Jul. 26, 2019

(87) PCT Pub. No.: WO2018/137017
PCT Pub. Date: Aug. 2, 2018

(65) Prior Publication Data
US 2020/0375354 A1     Dec. 3, 2020

(51) Int. Cl.
*A47B 51/00* (2006.01)
*B62H 3/00* (2006.01)

(52) U.S. Cl.
CPC ........ *A47B 51/00* (2013.01); *A47B 2051/005* (2013.01); *B62H 3/00* (2013.01)

(58) Field of Classification Search
CPC . A47B 51/00; A47B 2051/005; A47B 46/005; A47B 46/00; A47B 13/081;
(Continued)

(56) References Cited

U.S. PATENT DOCUMENTS

| 380,490 A | * | 4/1888 | Jewell | ............ A47B 88/48 312/323 |
| 415,056 A | * | 11/1889 | Phillips | ............ A47B 88/48 312/323 |

(Continued)

FOREIGN PATENT DOCUMENTS

| DE | 4223048 | 1/1994 |
| EP | 1820420 | 8/2007 |

(Continued)

OTHER PUBLICATIONS

Translation of Office Action dated Jan. 28, 2021, JP2019-562447.
(Continued)

*Primary Examiner* — Hiwot E Tefera
(74) *Attorney, Agent, or Firm* — Norton Rose Fulbright Canada LLP (57) ABSTRACT

An overhead storage unit is disclosed. The storage unit has an elongated guide member with a first horizontal segment mountable within an overhead storage area, a second vertical segment mountable below the overhead storage area, and a curved segment extending between the first and second segments. The storage unit also has a storage container with at least a first wall mounted to the guide member and displaceable therealong to be raised and lowered between a stored position and an accessible position. The first wall is disposed within the storage area and has a first orientation to define a bottom surface of the storage container in the stored position. The first wall is disposed below the storage area and has a second orientation different from the first orientation in the accessible position. A residential living unit and method are also disclosed.

17 Claims, 4 Drawing Sheets

(58) Field of Classification Search
CPC . A47B 88/48; A47B 2210/0056; A47B 77/10; A47B 77/04; A47B 88/60; A47B 88/433; A47B 88/40; A47B 63/00; A47B 95/008; A47B 2088/901; A47B 88/42; B62H 3/00; B62H 3/12; B62H 3/02; A47F 5/0892; E04H 6/005; A49B 49/002; E04F 19/08
USPC ....... 312/246, 233, 322, 245, 247, 306, 201, 312/248, 266, 242, 323, 325, 334.23, 315, 312/319.2, 319.3, 351, 334.6; 211/96, 99, 211/100, 116
See application file for complete search history.

(56) References Cited

U.S. PATENT DOCUMENTS

| | | | |
|---|---|---|---|
| 478,566 A | 7/1892 | Caspar | |
| 479,857 A * | 8/1892 | Tettelbach | F24C 15/02 |
| | | | 312/307 |
| 481,586 A * | 8/1892 | Paul | B41L 45/00 |
| | | | 101/134.5 |
| 581,803 A | 5/1897 | Armstrong | |
| 1,095,363 A * | 5/1914 | Weiss | A47B 88/493 |
| | | | 312/334.33 |
| 1,137,074 A | 4/1915 | Morris | |
| 1,312,385 A * | 8/1919 | Cahill | A47F 3/005 |
| | | | 312/246 |
| 1,529,601 A * | 3/1925 | Lyons | E06B 3/5045 |
| | | | 49/260 |
| 2,506,086 A | 5/1950 | Jess | |
| 2,547,597 A * | 4/1951 | Roggero | A47B 51/00 |
| | | | 108/102 |
| 2,555,254 A * | 5/1951 | Stebbins | A47B 46/00 |
| | | | 312/319.7 |
| 2,679,446 A | 5/1954 | Weil | |
| 2,839,349 A | 6/1958 | Culver | |
| 3,464,749 A | 9/1969 | Bishop | |
| 3,490,601 A * | 1/1970 | Warn, Sr. | A47G 21/14 |
| | | | D7/637 |
| 3,524,692 A * | 8/1970 | Preston | B65F 1/1436 |
| | | | 312/322 |
| 3,663,971 A | 5/1972 | Bonhote | |
| 3,770,133 A | 11/1973 | Kolker | |
| 3,814,366 A * | 6/1974 | Staifer | A47B 77/12 |
| | | | 248/286.1 |
| 3,973,812 A | 8/1976 | Poltorak | |
| 4,029,218 A * | 6/1977 | Matsuura | E04H 6/06 |
| | | | 414/240 |
| 4,117,939 A * | 10/1978 | Haddock | B66F 19/00 |
| | | | 414/11 |
| 4,134,629 A | 1/1979 | Hansen | |
| 4,150,861 A * | 4/1979 | Dufrancatel | A47B 46/005 |
| | | | 312/271 |
| 4,374,537 A | 2/1983 | Lindbergh | |
| 4,723,680 A | 2/1988 | Carroll | |
| 4,725,108 A | 2/1988 | Wilson | |
| 5,183,162 A | 2/1993 | Ritzenthaler | |
| 5,221,009 A | 6/1993 | Ritzenthaler | |
| 5,242,219 A | 9/1993 | Tomaka | |
| 5,249,858 A | 10/1993 | Nusser | |
| 5,294,006 A | 3/1994 | Deschino | |
| 5,383,628 A | 1/1995 | Harriehausen | |
| 5,474,189 A * | 12/1995 | Peterson | B62H 3/12 |
| | | | 211/17 |
| 5,475,949 A | 12/1995 | McCoy | |
| 5,499,584 A | 3/1996 | Taylor | |
| 5,649,751 A | 7/1997 | Longhurst et al. | |
| 5,758,782 A | 6/1998 | Rupert | |
| 5,772,295 A | 6/1998 | Sundmark | |
| 5,857,756 A * | 1/1999 | Fehre | A47B 46/005 |
| | | | 312/246 |
| 5,934,615 A | 8/1999 | Treichler et al. | |
| 6,039,422 A | 3/2000 | Butters | |
| 6,095,344 A | 8/2000 | White | |
| 6,250,728 B1 | 6/2001 | Thorp | |
| 6,336,692 B1 | 1/2002 | Snyder | |
| 6,367,898 B1 * | 4/2002 | Jobe | A47B 51/00 |
| | | | 312/246 |
| 6,550,878 B2 | 4/2003 | Nott et al. | |
| 6,733,095 B1 * | 5/2004 | Rieb | A47B 46/00 |
| | | | 312/122 |
| 6,851,376 B2 | 2/2005 | D Agostino | |
| 7,178,887 B2 | 2/2007 | Steadman | |
| 7,246,865 B1 | 7/2007 | Merrel, II | |
| 7,325,785 B2 | 2/2008 | Krengel | |
| 7,770,986 B1 | 8/2010 | Simaitis | |
| 8,061,789 B2 * | 11/2011 | Krueger | A47B 46/005 |
| | | | 211/100 |
| 8,136,897 B2 | 3/2012 | Mascari | |
| 8,157,108 B1 | 4/2012 | Waldrop | |
| 8,210,370 B2 | 7/2012 | Botkin | |
| 8,414,093 B2 * | 4/2013 | Moran | A47B 51/00 |
| | | | 312/248 |
| 8,424,983 B1 | 4/2013 | Strauss | |
| 8,443,991 B1 | 5/2013 | Ivey, III | |
| 8,636,251 B2 | 1/2014 | Mayer et al. | |
| 8,641,156 B2 | 2/2014 | Chow | |
| 8,814,490 B2 | 8/2014 | Inui | |
| 8,863,323 B2 | 10/2014 | Knapp et al. | |
| 8,926,031 B2 * | 1/2015 | Belton | A47B 88/407 |
| | | | 312/246 |
| 8,950,592 B1 | 2/2015 | Greenblatt et al. | |
| 8,985,344 B2 * | 3/2015 | Larson | B62H 3/12 |
| | | | 211/1.51 |
| 8,991,948 B2 | 3/2015 | Marsters | |
| 9,055,813 B2 | 6/2015 | Telthörster | |
| 9,392,912 B2 | 7/2016 | Haddad | |
| 9,414,672 B1 | 8/2016 | Flynn | |
| 9,578,993 B2 | 2/2017 | Stafford et al. | |
| 9,738,386 B2 | 8/2017 | Walton et al. | |
| 9,980,564 B2 | 5/2018 | Roberts | |
| 10,000,287 B2 | 6/2018 | Claflin et al. | |
| 10,085,552 B2 | 10/2018 | Boguslawski | |
| 10,315,767 B2 | 6/2019 | Claflin et al. | |
| 10,506,877 B1 * | 12/2019 | Edwards, II | A47B 61/04 |
| 10,925,391 B1 | 2/2021 | Stilley | |
| 2002/0079792 A1 | 6/2002 | Nott et al. | |
| 2005/0102746 A1 | 5/2005 | Wright et al. | |
| 2005/0173202 A1 | 8/2005 | Shaw | |
| 2006/0066188 A1 | 3/2006 | Crawford | |
| 2006/0108303 A1 | 5/2006 | Rupert | |
| 2006/0192468 A1 | 8/2006 | Gardner | |
| 2007/0294953 A1 | 12/2007 | Guillen | |
| 2008/0182224 A1 | 7/2008 | Ahearn | |
| 2009/0284110 A1 | 11/2009 | Mascari | |
| 2010/0108627 A1 | 5/2010 | Lupinacci et al. | |
| 2013/0015145 A1 | 1/2013 | Koepke | |
| 2015/0145393 A1 | 5/2015 | Young | |
| 2016/0235194 A1 | 8/2016 | Baranski | |
| 2018/0281956 A1 | 11/2018 | Fischer | |

FOREIGN PATENT DOCUMENTS

| | | |
|---|---|---|
| EP | 1925236 A | 5/2008 |
| JP | 4895927 | 11/1973 |
| JP | 5754669 | 4/1982 |
| JP | S5754669 A | 4/1982 |
| JP | 58196633 | 12/1983 |
| JP | 03128781 B2 | 5/1991 |
| JP | 0849403 | 2/1996 |
| JP | 08117036 | 11/1996 |
| JP | 2000079024 | 3/2000 |
| JP | 2000342353 | 12/2000 |
| JP | 2001029146 | 2/2001 |
| JP | 2012000261 A | 1/2012 |
| NL | 7712702 | 5/1979 |
| WO | 0042886 | 7/2000 |
| WO | 2018137017 A1 | 8/2018 |

(56) References Cited

OTHER PUBLICATIONS

International Search Report dated Oct. 24, 2017.
International Search Report and Written Opinion dated Dec. 30, 2020, International PCT Application PCT/CA2020/051320.
Extended European Search Report for EP application No. 17893588.8 dated Aug. 7, 2020.
International Search Report and Written Opinion, PCT/CA2021/051556, dated Jan. 25, 2022.

* cited by examiner

OVERHEAD STORAGE UNIT

CROSS-REFERENCE TO RELATED APPLICATIONS

This application is a national phase entry under 35 U.S.C. 371 of international patent application no. PCT/CA2017/050087 filed on Jan. 27, 2017, the entire contents of which are incorporated by reference herein.

TECHNICAL FIELD

The application relates generally to the storage of items and, more particularly, to overhead storage units.

BACKGROUND OF THE ART

In many jurisdictions, interior real estate is priced per unit of available floor space (e.g. $/ft$^2$). This pricing model encourages occupants to maximise the number of features that can comfortably be provided within a minimum area of floor space, resulting in a reduction of features and increased comfort.

In urban residential areas, relatively high unit floor space costs incentivize the construction of smaller living units. Developers of these smaller living units still wish to offer their occupants features and accessories associated with larger living areas, in order to accommodate the occupant's lifestyle. However, providing such features and accessories is difficult because less space is available in these smaller living units.

SUMMARY

In one aspect, there is provided an overhead storage unit, comprising: an elongated guide member having a first horizontal segment mountable within an overhead storage area, a second vertical segment mountable below the overhead storage area, and a curved segment extending between the first and second segments; and a storage container having at least a first wall, the storage container mountable to the guide member and displaceable therealong to be raised and lowered between a stored position and an accessible position, the first wall disposed at least partially within the overhead storage area and having a first orientation to define a bottom surface of the storage container in the stored position, and the first wall disposed below the overhead storage area and having a second orientation different from the first orientation in the accessible position.

In another aspect, there is provided a residential living unit, comprising: an overhead storage area; and an overhead storage unit, comprising: an elongated guide member having a first horizontal segment mounted within the storage area, a second vertical segment mounted below the storage area, and a curved segment extending between the first and second segments; and a storage container having at least a first wall, the storage container mounted to the guide member and displaceable therealong to be raised and lowered between a stored position and an accessible position, the first wall disposed within the storage area and having a first orientation to define a bottom surface of the storage container in the stored position, and the first wall disposed below the storage area and having a second orientation different from the first orientation in the accessible position.

In a further aspect, there is provided a method of storing an item in an overhead storage area, comprising: loading the item in a storage container having an orientation and being disposed beneath the overhead storage area; and raising the storage container to be stored within the overhead storage area by upwardly displacing the storage container along a pre-defined path, upward displacement of the storage container changing the orientation of the storage container to be different from the orientation when loading the storage container.

DESCRIPTION OF THE DRAWINGS

Reference is now made to the accompanying figures in which.

DETAILED DESCRIPTION

Figure 1A:
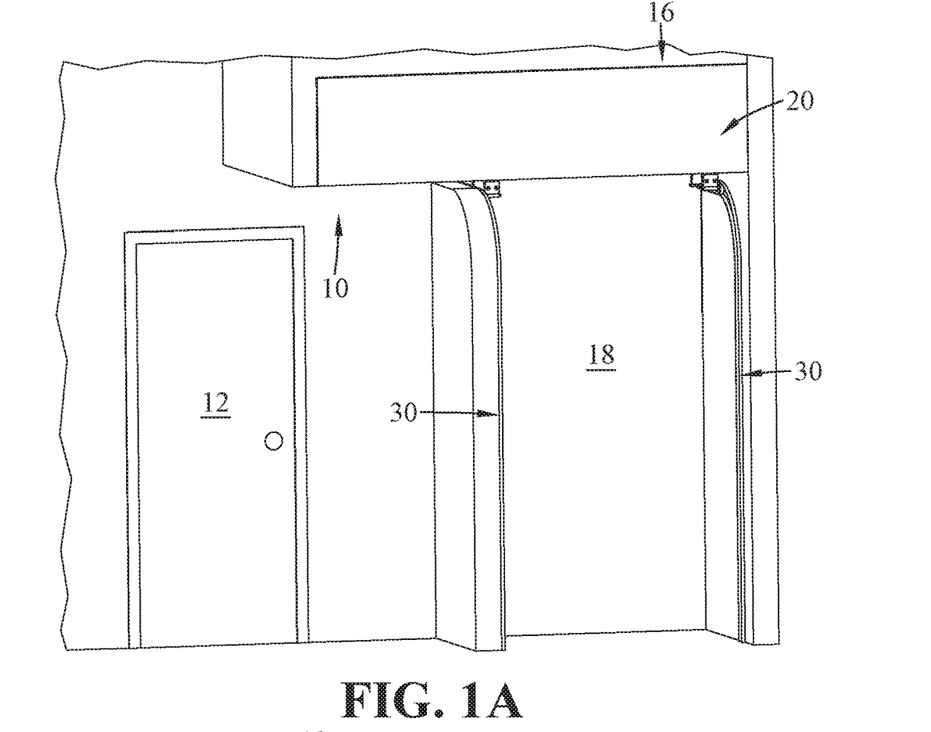
FIG. 1A is a perspective view of a residential living unit having an overhead storage unit, according to an embodiment of the present disclosure.
Figure 1B:
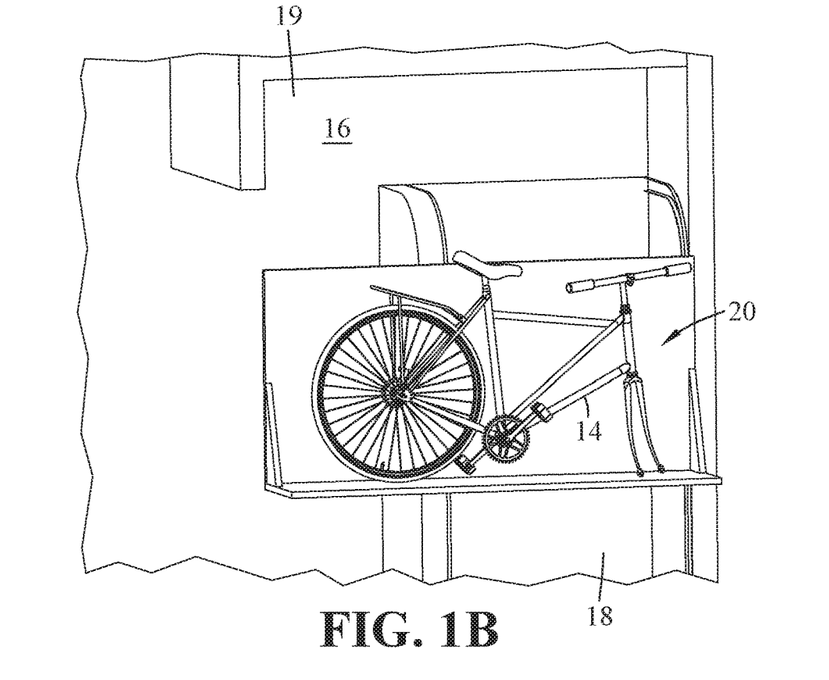
FIG. 1B is another perspective view of the overhead storage unit of FIG. 1A.

FIGS. 1A and 1B illustrate an overhead storage unit 10 provided in a residential living unit 12. In the depicted embodiment, the living unit 12 is a residential apartment, but it will be appreciated that the living unit 12 can also be other types of dwellings. Some non-limiting examples of a living unit 12 include a flat, condo, home, room, etc. Features of the overhead storage unit 10 (sometimes referred to herein simply as "storage unit 10") are displaceable so that one or more items 14 to be stored within the storage unit 10 can be stored away when not in use, and so that access to the items 14 can be provided. When stored away, features of the storage unit 10 are positioned such that they do not occupy the floor space of the living unit 12. This allows the valuable floor space to be liberated and used for other purposes, thereby contributing to the overall available floor space of the living unit 12. As will be described in greater detail herein, the storage unit 10 positions the items 14 in an overhead storage area 16.

The overhead storage area 16 is disposed above the floor of the living unit 12. More particularly, the overhead storage area 16 is located about the average level of the head of an occupant of the living unit 12. This position of the overhead storage unit 16 allows the occupant to move freely about the living unit 12 without being obstructed by the storage unit 10. The configuration of the overhead storage area 16 can take different forms. For example, in the depicted embodiment, the overhead storage area 16 is located above a closet 18 of the living unit 12. The overhead storage area 16 is defined by the interconnected walls of an overhead structure 19 positioned on top of the closet 18. In alternate embodiments, the overhead storage area 16 is disposed adjacent to the ceiling, in a plenum area defined within a suspended ceiling and above the living unit 12. In another alternate embodiment, the overhead storage area 16 is defined by a lowered section of the ceiling that is continuous with the remainder of the ceiling of the living unit 12. It is therefore appreciated that many configurations of the overhead storage area 16 are within the scope of the present disclosure, provided that the overhead storage area 16 is raised above the floor of the living unit 12 such that the storage unit 10, when stored within the overhead storage area 16, does not disrupt the movement of the occupant about the living unit 12. Features of the storage unit 10 are displaceable to raise the items 14 into the overhead storage area 16 to store the items 14 away, and to lower the items 14 from the overhead storage area 16 to provide access to the items 14.

Figure 2A:
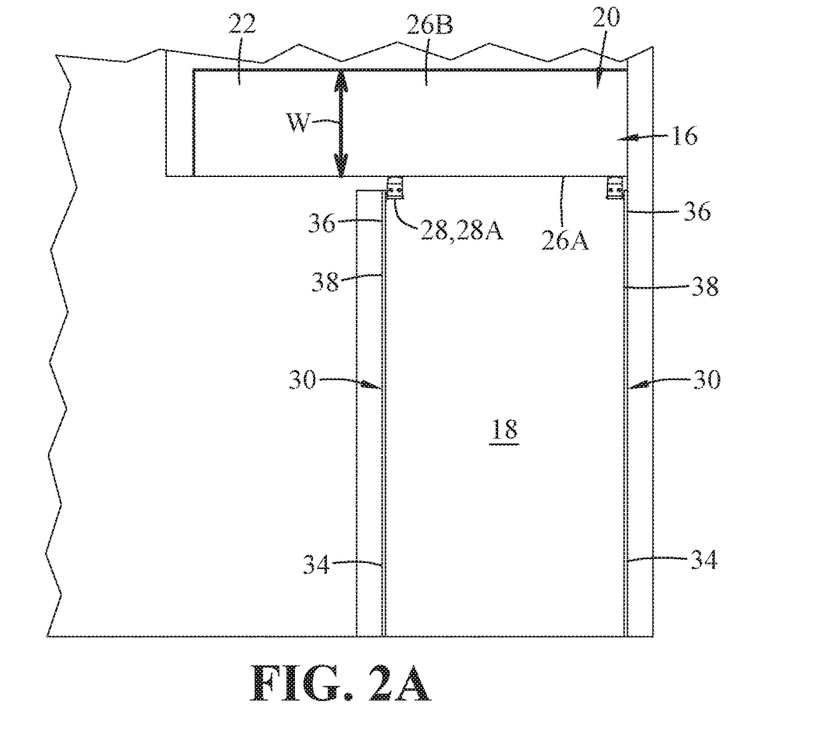
FIG. 2A is a perspective view of the overhead storage unit of FIG. 1A being shown in a stored position.
Figure 2B:
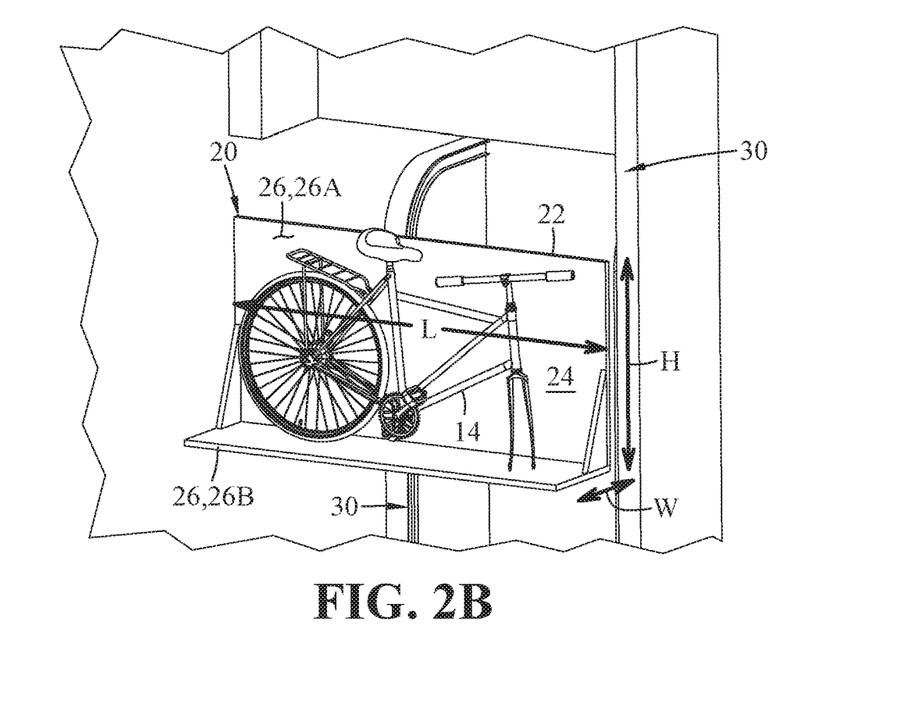
FIG. 2B is a perspective view of the overhead storage unit of FIG. 1A being shown in an accessible position.

Referring to FIGS. 2A and 2B, the storage unit 10 includes a displaceable storage container 20 for storing the items 14, and one or more guide members 30 for guiding displacement of the storage container 20 between a stored position and an accessible position.

The storage container 20 can be any suitably shaped and sized object for holding and displacing the items 14. In the depicted embodiment, the storage container 20 includes a box-like storage structure 22 having an at least partially hollow interior 24 in which the items 14 are stored. The storage structure 22 includes one or more interconnected walls 26, which include at least a first wall 26A and a second wall 26B. The walls 26 are depicted as being planar bodies, but may be non-planar in other embodiments. Similarly, the first and second walls 26A,26B are shown as being substantially uninterrupted along their length, but in alternate embodiments, one or both of the first and second walls 26A,26B may be interrupted along their length.

The first wall 26A and the second wall 26B are interconnected along their common edges and are perpendicular with respect to one another. The first wall 26A is the lowermost wall 26 of the storage structure 22 when the storage container 20 is in the stored position, as shown in FIG. 2A. The first wall 26A has a first orientation such that it defines a bottom surface 26C (see FIGS. 3A and 3B) of the storage container 20. In the depicted embodiment, the bottom surface 26C is the lowermost surface of the storage container 20 when it is in the stored position. The second wall 26B is the lowermost wall 26 of the storage structure 22 when the storage container 20 is in the accessible position, as shown in FIG. 2B. The second wall 26B can contribute to supporting the weight of the items 14 stored within the storage structure 22. The first wall 26A can also contribute to supporting the weight of the items 14 stored within the storage structure 22 when in the stored position. The storage structure 22 can include hooks, brackets, ties, mounts, or other devices to secure the items 14 therein, and to prevent their displacement during movement of the storage container 20. In an embodiment, the storage structure 22 has a door to provide access to the interior 24 and to the items 14 therein. In an alternate embodiment, the storage structure 22 is open along a front portion thereof to provide direct access to the interior 24.

In the depicted embodiment, the item 14 stored within the storage structure 22 is a bicycle. In order to store such items 14, the storage container 20 or storage structure 22 may include interconnected walls 26 which define a hermetically-sealed interior 24. The sealed interior 24 prevents liquids and debris from exiting the storage container 20 during displacement thereof. Similarly, the storage container 20 can be made from any suitable material to confer impermeability, amongst other desired properties. The storage container 20 may be used to store other types of items 14 as well.

The storage container 20 is mounted to the one or more guide members 30. Each guide member 30 extends along a length to guide the displacement of the storage container 20 along said length. More particularly, each guide member 30 has a first horizontal segment 32 mounted within the overhead storage area 16. In the depicted embodiment, the first segment 32 is mounted to an upper extremity of the closet 18 at a lower end of the overhead storage area 16. Each guide member 30 also has a second vertical segment 34 mounted below the overhead storage area 16. In the depicted embodiment, the second segment 34 is mounted to a lower extremity of the closet 18. The second segment 34 extends downwardly from the overhead storage area 16 to about the level of the floor. Each guide member 30 also has a curved segment 36 extending between the first and second segments 32,34. In the depicted embodiment, the curved segment 36 is downwardly curved to guide displacement of the storage container 20 from the raised stored position to the lowered accessible position. Each segment 32,34,36 defines a portion of a pre-defined displacement path along which the storage container 20 is guided when being displaced. In an alternate embodiment, the segments 32,34,36 are not mounted directly to a structure, but are free standing.

It will be appreciated that each guide member 30 can take any suitable form to accomplish the above-described functionality. For example, in the depicted embodiment, each guide member 30 includes a guide rail 38. FIGS. 2A and 2B show two laterally-spaced apart guide rails 38 mounted to opposed lateral sides of the closet 18. The storage container 20 has rotatable guide bodies 28, which in the depicted embodiment are guide wheels 28A, mounted to an underside of the storage container 20. Each guide wheel 28A engages a corresponding one of the guide rails 38 to be displaced along the guide rail 38. The cooperation of the guide wheels 28A with the guide rails 38 allows the storage container 20 to be displaced.

Other configurations for the guide member 30 are within the scope of the present disclosure. In an alternate embodiment, each guide member 30 includes an elongated rack and the storage container 20 has a rotatable guide body that includes a gear, such as a pinion. Each guide body pinion engages a corresponding one of the racks to be displaced therealong. In another alternate embodiment, each guide member 30 includes a groove in a surface of the closet 18, for example, and the storage container 20 has a rotatable guide body that includes a wheel. Each guide body wheel engages a corresponding one of the grooves to be displaced therealong.

The displacement of the storage container 20 along the guide member 30 changes the orientation of the storage container 20. The storage container 20 is displaceable to be raised to a stored position, and lowered to an accessible position.

In the stored position, and as shown in FIG. 2A, the storage container 20 and the items 14 are stored away. The storage container 20 and/or the first wall 26A have a first orientation. In the depicted embodiment, the first wall 26A and the storage container 20 lie horizontally within the overhead storage area 16 in the stored position. The storage container 20 and the items 14 are therefore raised above the floor of the living unit 12 to be stored away, thereby freeing up the floor space of the living unit 12. In the depicted embodiment, the storage container 20 is on its "back", such that the first wall 26A of the storage structure 22 has a horizontal orientation and the second wall 26B has an upright orientation. The storage structure 22 is shown resting on, and supported by, the first horizontal segment 32 of the guide members 30. In the depicted embodiment, the overhead storage area 16 is concealed from view by the storage container 20 when it is in the stored position. In an alternate embodiment, a part of the storage container 20 protrudes out of the overhead storage area 16 when the storage container is in the stored position. In such an embodiment, the storage container 20 is disposed at least partially within the overhead storage area 16.

In the accessible position, and as shown in FIG. 2B, the storage container 20 and the items 14 are accessible to the occupant. The storage container 20 and/or the first wall 26B have a second orientation that is different from the first orientation shown in FIG. 2A. In the depicted embodiment, the second orientation is offset from the first orientation by about 90°. The first wall 26A and the storage container 20 are disposed upright below the overhead storage area 16 so that the occupant can access the items 14 in the storage container 20. The storage container 20 and the items 14 are therefore suspended in proximity to the floor of the living unit 12. In the depicted embodiment, the first wall 26A of the storage structure 22 has an upright orientation and the second wall 26B has a horizontal orientation. The storage structure 22 is engaged with the second vertical segment 34 of the guide members 30.

It is thus appreciated that the first wall 26A, and indeed other walls 26 of the storage structure 22, under a change in orientation when the storage container 20 is displaced between the stored and accessible positions. This change in the orientation of the storage container 20 may be better appreciated by considering the dimensions of the storage structure 22 as it is displaced between the stored and accessible positions. The storage structure 22 has a height H, a length L, and a width W. In the stored position, the width W of the storage structure 22 is measured in a vertical plane and the height H is measured in a horizontal plane. In the accessible position, the width W of the storage structure 22 is measured in a horizontal plane and the height H is measured in a vertical plane.

This change in the orientation of the storage container 20 between the stored and accessible positions allows the storage container 20 to occupy a minimum volume of the overhead storage area 16 without compromising the interior 24 storage space for the items 14. More particularly, the storage container 20 in the stored position has a substantially flat or horizontal profile, such that it occupies less vertical space than when it is has an upright orientation. This allows for a smaller overhead storage area 16 to be used, which may be particularly desirable in living units 12 which have low ceilings. Similarly, the upright orientation of the storage container 20 in the accessible position allows full access to the interior 24 by the occupant, at a lowered position that is comfortable for the occupant to load and unload the items 14 from the storage container 20.

Figure 3A:
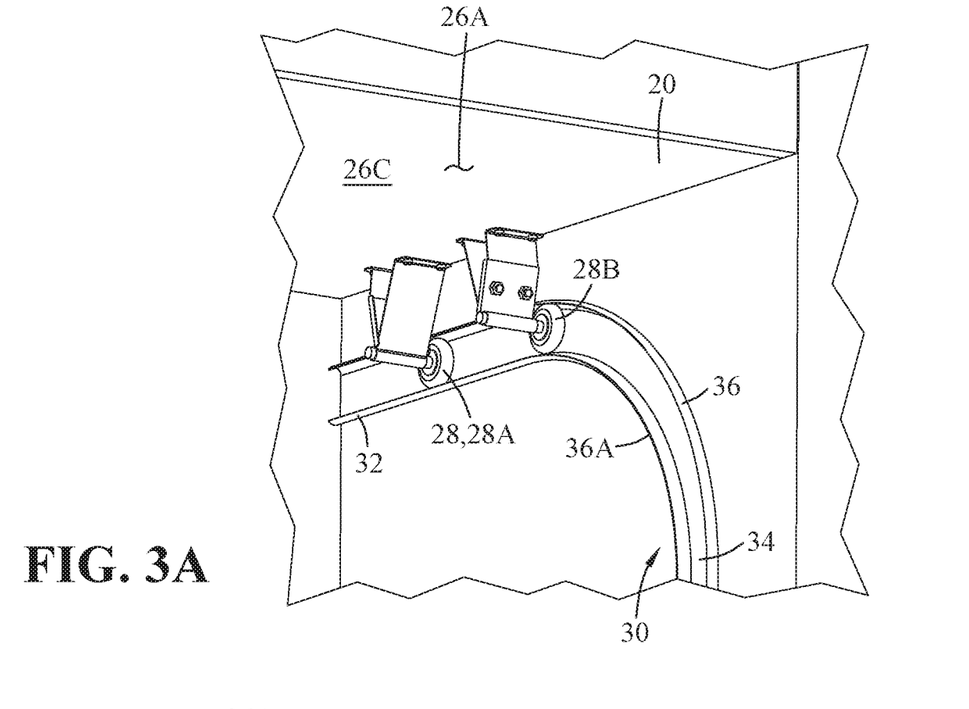
FIG. 3A is a perspective view of a guide member of the overhead storage unit of FIG. 1A.
Figure 3B:
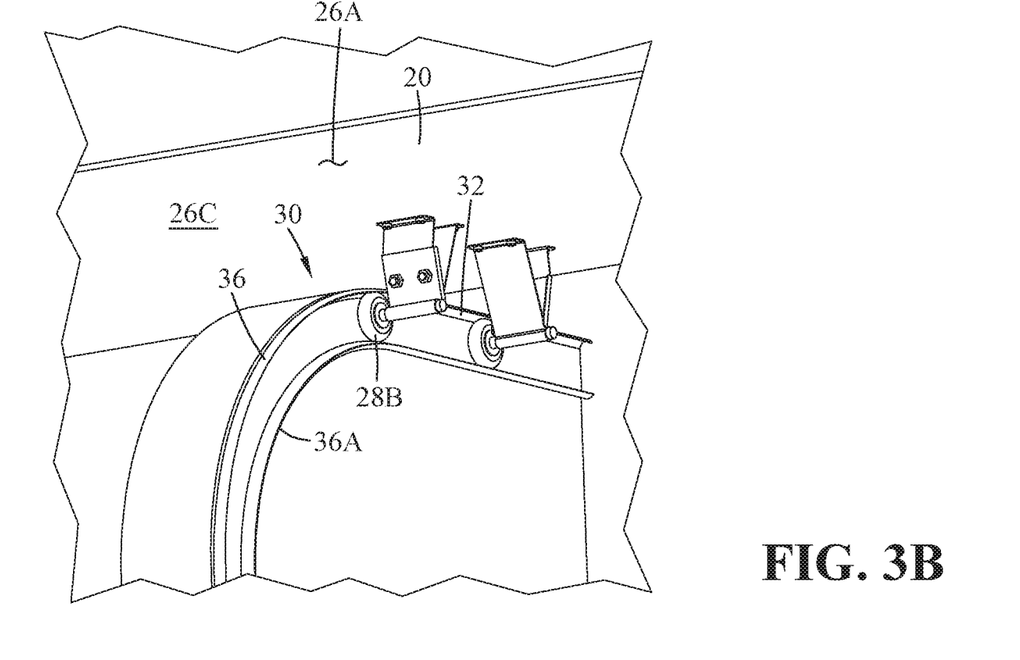
FIG. 3B is another perspective view of the guide member of FIG. 3A.

Referring to FIGS. 3A and 3B, the curved segment 36 of each guide member 30 helps to change the orientation of at least the first wall 26A. The curved segment 36 extends between the horizontal first segment 32 and the vertical second segment 34. From the stored position in which the first wall 26A has the first orientation, it and the storage container 20 are first displaced along the first segment 32 in a horizontal plane and then downwardly over the curved segment 36. The curved segment 36 changes the orientation of the first wall 26A to the second orientation as it is being displaced such that the first wall 26A is upright after having been displaced past the curved segment 36 and along the vertical second segment 34. The second orientation of the first wall 26A is therefore offset from the first orientation by about 90°.

In the depicted embodiment, the rotatable guide bodies 28 of the storage container 20 include leading guide bodies 28B displaceable along corresponding guide members 30. The leading guide bodies 28B, shown in the depicted embodiment as leading guide wheels, engage two laterally-spaced apart guide members 30 so as to form a pair of leading guide bodies 28B. The leading guide bodies 28B are disposed adjacent to an upper end of the curved segment 36 of each guide member 30 when the storage container 20 is in the stored position. By positioning the leading guide bodies 28B in proximity to the upper end of the curved segment 36, the effort required to lower the storage container 20 from the stored position is reduced. Indeed, the close proximity of the leading guide bodies 28B to the upper end of the curved segment 36 means that the storage container 20 only has to travel a relatively short distance along the first segment 32 before the leading guide bodies 28B enter the curved segment 36, at which point gravity acting on the storage container 20 will assist in lowering it from the stored position. This reduced effort is particularly useful if the storage container 20 is manually displaced, as discussed in greater detail below.

The proximity of the leading guide bodies 28B to the upper end of the downwardly curved segment 36 can vary, depending on the desired effort required to lower the storage container 20, amongst other factors. For example, in the depicted embodiment, the leading guide bodies 28B have a default location within a downwardly curved portion 36A of the curved segment 36 when the storage container 20 is in the stored position. This positioning of the leading guide bodies 28B helps to bias the storage container 20 downward, and thus helps to reduce the effort required to lower the storage container 20. In such a configuration, tension may be applied to the storage container 20 to hold it back and reduce the likelihood of it accidentally lowering. This tension can be provided by a cable, spring, or other mechanical device.

In an alternate embodiment, the leading guide bodies 28B are disposed at the onset of the downwardly curved portion 36A of the curved segment 36 when the storage container 20 is in the stored position. This positioning of the leading guide bodies 28B also helps to bias the storage container 20 downward, and thus helps to reduce the effort required to lower the storage container 20. In another alternate embodiment, the leading guide bodies 28B are disposed on the first segment 32 just before the junction of the first segment 32 and the curved segment 36. This positioning of the leading guide bodies 28B still facilitates lowering the storage container, but more effort may be required than in the configuration where the leading guide bodies 28B are within the downwardly curved portion 36A. Although the curved segment 36 is shown in FIGS. 3A and 3B as having two downwardly curved portions 36A, in an alternate embodiment, the curved segment 36 has only one downwardly curved portion 36A along which the leading guide bodies 28B are displaced.

Figure 4:
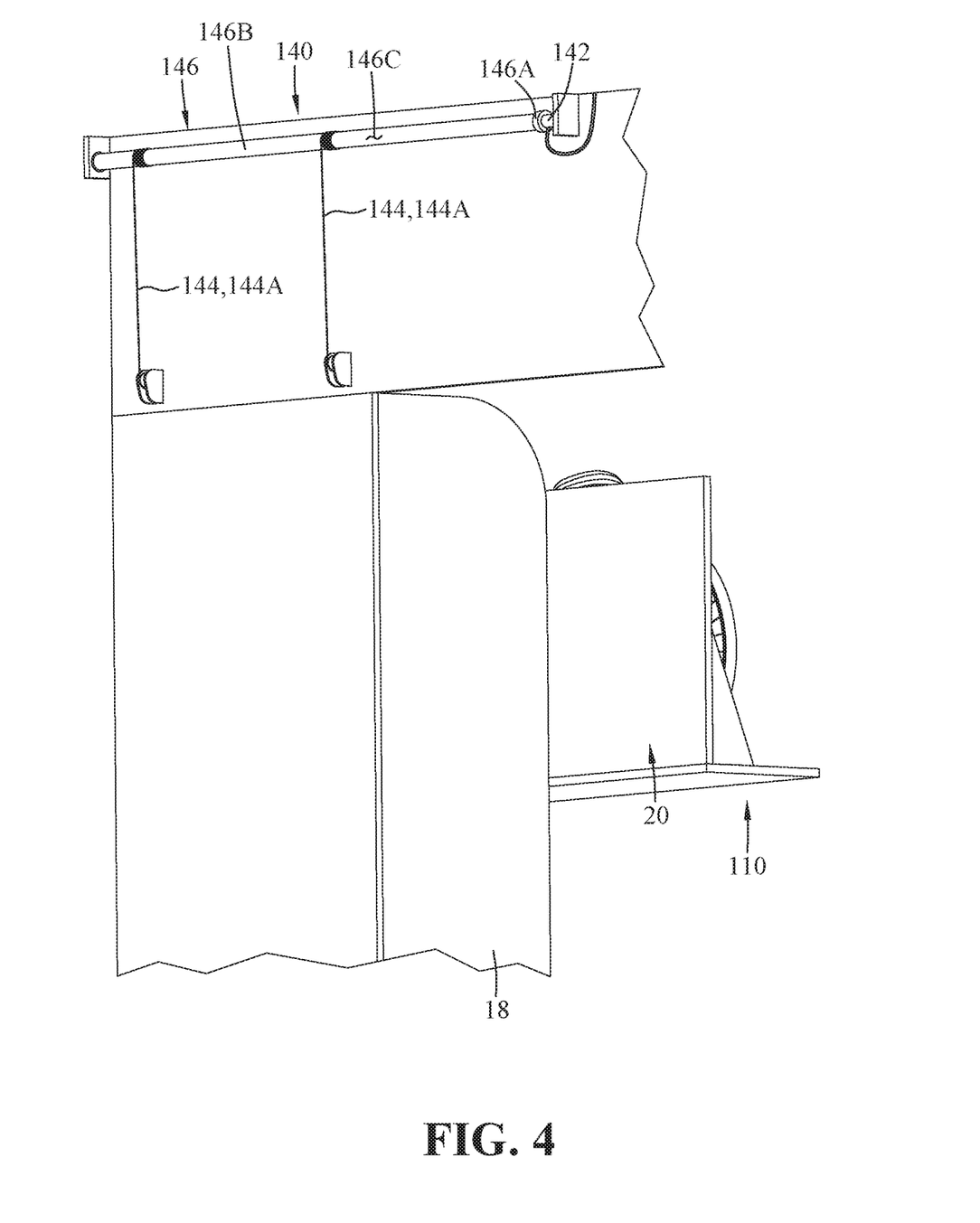
FIG. 4 is a perspective view of a motor assembly of an overhead storage unit.

The displacement of the storage container 20 along the guide member 30 can be performed manually by the occupant, or with the assistance of motive power. In the embodiment of FIG. 4, the storage unit 110 includes a motive power source. More particularly, the storage unit 110 has a motor assembly 140. The motor assembly 140 provides motive power to the storage container 20 to displace it between the stored and accessible positions. In the depicted embodiment, and to optimise available space, the motor assembly 140 is mounted behind the closet 18. In an alternate embodiment, and to improve access thereto, the motor assembly 140 is mounted above the closet in the overhead storage area 16. The motor assembly 140 includes a motor 142. Suitable brackets or mountings can be provided to secure the motor 142 in place. The motor 142 drivingly engages one or more displacement members 144. The displacement members 144 are mounted to the storage container 20 to displace it between the stored and accessible positions. The motor 142 can be controlled manually with a switch, or from a distance with a remote in communication with the motor 142 to control actuation thereof.

In the embodiment of FIG. 4, the motor 142 includes a tubular motor 146 and the displacement members 144 include motor cables 144A. The tubular motor 146 has a motive output 146A that rotationally drives a motor housing 146B or sleeve having an outer surface 146C. The outer surface 146C of the motor housing 146B is rotatable about a longitudinal axis of the tubular motor 146. The motor cables 144A are wound about the outer surface 146C, such that rotation of the motor housing 146B causes the motor cables 144A to spool and unspool about the outer surface 146C. An end of each motor cable 144A is attached to the storage container 20 so that the spooling and unspooling of the motor cables 144A will cause the storage container 20 to displace.

The displacement of the storage container 20 with the motor assembly 140 occurs as follows. To lower the storage container 20 from the stored position where it has the first orientation, the tubular motor 146 performs a controlled unspool of the motor cables 144A by rotating to unwind the motor cables 144. This provides slack in the motor cables 144A allowing the storage container 20 to descend based on gravity. To raise the storage container 20 from the accessible position, the tubular motor 146 draws in the motor cables 144A by rotating to spool them about the outer surface 146C. This removes slack from the motor cables 144A and applies tension thereto, causing the storage container 20 to be raised along the guide member 30.

Other techniques are within the scope of the present disclosure for displacing the storage container 20. In an alternate embodiment, the motive power is supplied by any other suitable type of drive, including, but not limited to, a crank with a manual mechanism and/or a spring balance. In an embodiment, the storage unit 10,110 includes a sensor to monitor displacement of the storage container 20, and to prevent the storage container 20 from being lowered too far. Similarly, the storage unit 10,110 may include a stop member to limit the downward displacement of the storage container 20.

Referring to FIGS. 2A and 2B, there is also disclosed a method of storing an item 14 in an overhead storage area 16. The item 14 is loaded in the storage container 20 which has a first orientation, and which is disposed beneath the overhead storage area 16. The storage container 20 is raised to be stored partially or completely within the overhead storage area 16. The storage container 20 is raised by upwardly displacing it, such as with the assistance of motive power, along a pre-defined path, such as the one provided by the guide member 30. The upward displacement of the storage container 20 changes its orientation to be different from the orientation when loading the storage container 20.

In light of the preceding, it can be appreciated that the storage unit 10,110 disclosed herein has a storage container 20 that is storable in an overhead position, which can be lowered and raised, and whose movement transforms the orientation of the storage container 20 between the stored and accessible positions. When used in a relatively small living unit 12, the storage unit 10,110 helps to minimise the space occupied by items 14 that need to be stored. In the accessible position, the storage container 20 can be lowered to a convenient height to facilitate loading and unloading, thereby eliminating the necessity and inconvenience of a step ladder. By facilitating the storage and easy retrieval of items 14, the storage unit 10,110 helps to increase the available living space of the relatively small living unit 12.

The above description is meant to be exemplary only, and one skilled in the art will recognize that changes may be made to the embodiments described without departing from the scope of the invention disclosed. For example, the descriptive terms "horizontal", "vertical", and "upright" used herein do not limit the feature to being perfectly level or perfectly normal to a level plane. These features can deviate from the level and from the vertical provided that they remain substantially horizontal or vertical. Similarly, although the storage unit 10,110 is disclosed herein as being part of a residential living unit 12, it will be appreciated that the storage unit 10,110 can be used in other types of building units, such as commercial or industrial units. Still other modifications which fall within the scope of the present invention will be apparent to those skilled in the art, in light of a review of this disclosure, and such modifications are intended to fall within the appended claims.

The invention claimed is:

1. An overhead storage unit, comprising:
   an elongated guide member having a first horizontal segment mountable within an overhead storage area, the overhead storage area defined by interconnected walls of a stationary overhead structure, a second vertical segment mountable below the overhead storage area to a fixed structure, the second vertical segment offset from the first horizontal segment by about 90°, and a curved segment extending between the first and second segments, the guide member including guide sections being laterally spaced apart from each other; and
   a storage container having at least a first wall, the storage container mountable to the guide member and displaceable therealong to be raised and lowered between a stored position and an accessible position, the first wall having a plurality of rotatable guide bodies being laterally spaced apart and each guide body being displaceable along one of the guide sections to displace the storage container between the stored and accessible positions, the first wall disposed at least partially within the overhead storage area and having a first orientation to define a bottom surface of the storage container in the stored position, and the first wall disposed below the overhead storage area and having a second orientation different from the first orientation in the accessible position.

2. The storage unit as defined in claim 1, wherein the second orientation of the first wall is offset from the first orientation by about 90°.

3. The storage unit as defined in claim 1, wherein the first wall lies horizontally within the overhead storage area in the stored position, and is disposed upright below the overhead storage area in the accessible position.

4. The storage unit as defined in claim 1, wherein a leading one of the guide bodies is disposed adjacent to the curved segment of the guide member when the storage container is in the stored position.

5. The storage unit as defined in claim 4, wherein said leading one of the guide bodies is disposed on a downwardly curved portion of the curved segment when the storage container is in the stored position to bias the storage container downward.

6. The storage unit as defined in claim 1, further comprising a motor assembly having a motor drivingly engaging at least one displacement member, said displacement member being mounted to the storage container to displace the storage container between the stored and accessible positions.

7. The storage unit as defined in claim 6, wherein the motor includes a tubular motor and said displacement member includes a motor cable woundable about an outer surface of the tubular motor.

8. The storage unit as defined in claim 1, wherein the guide sections are guide rails and the plurality of rotatable guide bodies includes a plurality of guide wheels each being displaceable along one of the guide rails, at least one of the guide wheels being disposed on a downwardly curved portion of the curved segment of a corresponding guide rail when the storage container is in the stored position to bias the storage container downward.

9. The storage unit as defined in claim 1, wherein the first wall interconnects with at least a second wall and is perpendicular thereto, the second wall being oriented upright and the first wall being oriented horizontally within the overhead storage area when the storage container is in the stored position, and the second wall being oriented horizontally and the first wall being oriented upright below the overhead storage area when the storage container is in the accessible position.

10. The storage unit as defined in claim 1, wherein walls of the storage container including the first wall are connected together to define a hermetically-sealed interior of the storage container.

11. The storage unit as defined in claim 1, wherein the first wall interconnects with a second wall of the storage container and is perpendicular to the second wall, the first and second walls delimiting an interior of the storage container, the storage container being open along a front portion thereof in the accessible position to provide access to the interior.

12. A residential living unit, comprising:
an overhead storage area defined by interconnected walls of a stationary overhead structure in the residential living unit; and
an overhead storage unit, comprising:
an elongated guide member having a first horizontal segment fixedly mounted within the storage area, a second vertical segment fixedly mounted to a fixed structure below the storage area, the second vertical segment offset from the first horizontal segment by about 90°, and a curved segment extending between the first and second segments, the guide member including guide sections being laterally spaced apart from each other; and
a storage container having at least a first wall, the storage container mounted to the guide member and displaceable therealong to be raised and lowered between a stored position and an accessible position, the first wall having plurality of rotatable guide bodies being laterally spaced apart and each guide body being displaceable along one of the guide sections to displace the storage container between the stored and accessible positions, the first wall disposed within the storage area and having a first orientation to define a bottom surface of the storage container in the stored position, and the first wall disposed below the storage area and having a second orientation different from the first orientation in the accessible position.

13. The living unit as defined in claim 12, wherein the second orientation of the first wall is offset from the first orientation by about 90°.

14. The living unit as defined in claim 12, wherein a leading one of the guide bodies is disposed on a downwardly curved portion of the curved segment when the storage container is in the stored position to bias the storage container downward.

15. The living unit as defined in claim 12, further comprising a motor assembly having a motor drivingly engaging at least one displacement member, said displacement member being mounted to the storage container to displace the storage container between the stored and accessible positions.

16. The living unit as defined in claim 12, wherein the first wall interconnects with at least a second wall and is perpendicular thereto, the second wall being oriented upright and the first wall being oriented horizontally within the storage area when the storage container is in the stored position, and the second wall being oriented horizontally and the first wall being oriented upright below the storage area when the storage container is in the accessible position.

17. The living unit as defined in claim 12, wherein the storage area is above a closet and is concealed from view by the storage container when the storage container is in the stored position.

* * * * *